(12) United States Patent
Barlow et al.

(10) Patent No.: US 7,874,327 B2
(45) Date of Patent: Jan. 25, 2011

(54) TREE FEEDING CONTROL FOR A TREE HANDLING DEVICE

(75) Inventors: Duane Anthony Barlow, Brantford, CA (US); David Charles Princz, Paris, CA (US)

(73) Assignee: Tigercat Industries Inc., Paris, Ontario (CA)

( * ) Notice: Subject to any disclaimer, the term of this patent is extended or adjusted under 35 U.S.C. 154(b) by 814 days.

(21) Appl. No.: 11/423,747

(22) Filed: Jun. 13, 2006

(65) Prior Publication Data

US 2006/0278305 A1 Dec. 14, 2006

Related U.S. Application Data

(60) Provisional application No. 60/689,562, filed on Jun. 13, 2005.

(51) Int. Cl.
*A01G 23/08* (2006.01)

(52) U.S. Cl. ...................................................... 144/4.1

(58) Field of Classification Search ................. 144/382, 144/391, 392, 393, 394, 402, 403, 404, 4.1, 144/34.1, 24.13; 414/23; 60/698–718
See application file for complete search history.

(56) References Cited

U.S. PATENT DOCUMENTS

| | | | | |
|---|---|---|---|---|
| 3,587,681 A | * | 6/1971 | Wehr | 144/24.13 |
| 3,735,788 A | * | 5/1973 | Coughran, Jr. | 144/339 |
| 4,742,854 A | * | 5/1988 | Forslund | 144/250.17 |
| 4,972,890 A | * | 11/1990 | Isley | 144/246.1 |
| 5,088,532 A | * | 2/1992 | Eggers et al. | 144/356 |
| 5,148,843 A | * | 9/1992 | Cote | 144/24.13 |
| 5,735,325 A | * | 4/1998 | Timperi et al. | 144/250.17 |
| 5,785,101 A | | 7/1998 | Wildey | |
| 6,293,479 B1 | * | 9/2001 | Kaczmarski et al. | 241/92 |
| 6,550,506 B1 | * | 4/2003 | Levesque et al. | 144/338 |
| 6,962,178 B2 | * | 11/2005 | Duval | 144/3.1 |
| 6,986,368 B2 | * | 1/2006 | Brown | 144/4.1 |
| 7,044,409 B2 | * | 5/2006 | Stelter et al. | 241/28 |
| 2005/0098231 A1 | * | 5/2005 | Alftan | 144/24.13 |

FOREIGN PATENT DOCUMENTS

WO PCT/F198/00158 2/1998
WO WO9941972 * 8/1999

OTHER PUBLICATIONS

Australian Patent Office, Examiner's Report, Dec. 17, 2009, Application No. 2006202502.

* cited by examiner

*Primary Examiner*—Dana Ross
*Assistant Examiner*—Jennifer Chiang
(74) *Attorney, Agent, or Firm*—Neil Henderson

(57) ABSTRACT

In a tree handling device, where the tree is fed longitudinally through at least three drive wheels driven by a fixed-displacement hydraulic pump, feeding commences with all drive wheels simultaneously propelling the tree longitudinally through the knife arms and frame. During feeding, once the approximate maximum feeding speed of the drive wheels is achieved, one of the drive wheels is shifted to a free-wheeling condition, allowing the maximum feed speed to increase.

18 Claims, 15 Drawing Sheets

TREE FEEDING CONTROL FOR A TREE HANDLING DEVICE

REFERENCE TO RELATED APPLICATION

This application is a formal application based on and claiming priority from a U.S. provisional patent application, No. 60/689,562, filed Jun. 13, 2005.

BACKGROUND OF THE INVENTION

1. Field of the Invention

This invention applies to tree handling devices for the logging industry, and particularly to heads mounted to forestry carriers for harvesting and processing trees.

2. Description of the Prior Art

Tree harvesting and processing heads are well known in the logging industry and generally perform several operations including felling, delimbing, debarking, bucking, sorting and piling trees, e.g. U.S. Pat. No. 5,785,101 (Wildey). To effect the delimbing, debarking and bucking operations, various means have been used to feed the felled tree longitudinally through the head. The present invention is concerned with those heads employing some form of rotary drive mechanism for tree feeding e.g. hydraulically driven wheels or tracks.

It is well known in the logging industry that improved productivity can be achieved through increased feeding force and increased feeding speed. Increasing the feeding force improves the ability to accelerate and decelerate the tree and improves the ability to delimb heavily branched trees or bunches of trees. Increasing the feeding speed reduces the time required to process each tree or bunch of trees.

The most durable tree-feeding designs have used fixed-displacement hydraulic motors for their rotary drive mechanisms. However, with fixed-displacement motors, either high feeding speed or high feeding force can be achieved, but not both without excessive hydraulic flow and pressure (horsepower). These limitations are especially evident on the smaller, lower horsepower carriers. Using higher horsepower carriers requires more fuel and adds greater overall costs to production. To achieve the desired increases in feeding speed and feeding force while maintaining good efficiency, various methods have been employed in the prior art including variable displacement hydraulic motors, dual-displacement or multiple-displacement hydraulic motors and the like. These designs have proven to lack the durability and simplicity of simple fixed displacement motors and add complexity and cost to the head.

It is also known in the prior art that employing three or more drives in a triangulated or similar arrangement reduces the friction as the tree feeds through the head. Multiple drives also increase the force that can be transmitted to the tree without causing excessive fiber damage. Generally, these multiple drive designs have proven to be superior, especially in heavily branched trees. Heads with only two drives usually employ one or more idler or free-wheeling wheels for the tree to slide against as it is being fed, to approximate the reduced friction of a head with three or more drives. However, these non-powered idler wheels tend to plug with debris and cease to rotate, thereby contributing to greater friction and loss of performance.

It is also known in the prior art that heads using multiple tree feeding drives can be configured to provide anti-slip against the tree as it is feeding through the head by using a flow-divider principle. For example, International Patent Application publication no. WO 99/41972 (Pinomaeki) shows how each of two main driving wheels having their respective hydraulic motors connected in series to corresponding hydraulic motors mechanically connected to each other and to a third driving wheel can limit slip of the main drive wheels. However, using this design adds cost and complexity to the drive system without improving the feed force or feed speed over simple two wheel drive systems. This design simply forces all three wheels to drive the tree at the same relative speed, thereby eliminating slip unless all three wheels slip. If all three wheels slip, there is no appreciable improvement.

Also in the prior art, it is known that harvesting certain tree species, for example eucalyptus, requires the bark to be removed from the stem almost immediately after felling. If the bark is allowed to remain on the stem for any length of time, it becomes very difficult and expensive to remove. Most tree harvesting heads used in these applications are equipped with special feeding wheels to help strip the bark from the stem. Typically it requires a minimum of three and up to seven or more full length tree-feeding passes to remove the bark. The more passes required, the more inefficient the operation and the more damage is done to the tree fibres.

SUMMARY OF THE INVENTION

It is an object of this invention to attempt to provide increased tree-harvesting performance through increased feeding force, increased feeding speed, and improved control of the individual tree feeding drive means while minimizing the power requirements from the carrier.

The present invention addresses the limitations of these prior art devices and provides increased feeding speed, feeding force, durability and efficiency through novel design. Features of the invention will become apparent in the detailed description below.

DETAILED DESCRIPTION OF THE PREFERRED EMBODIMENT

Figure 1:
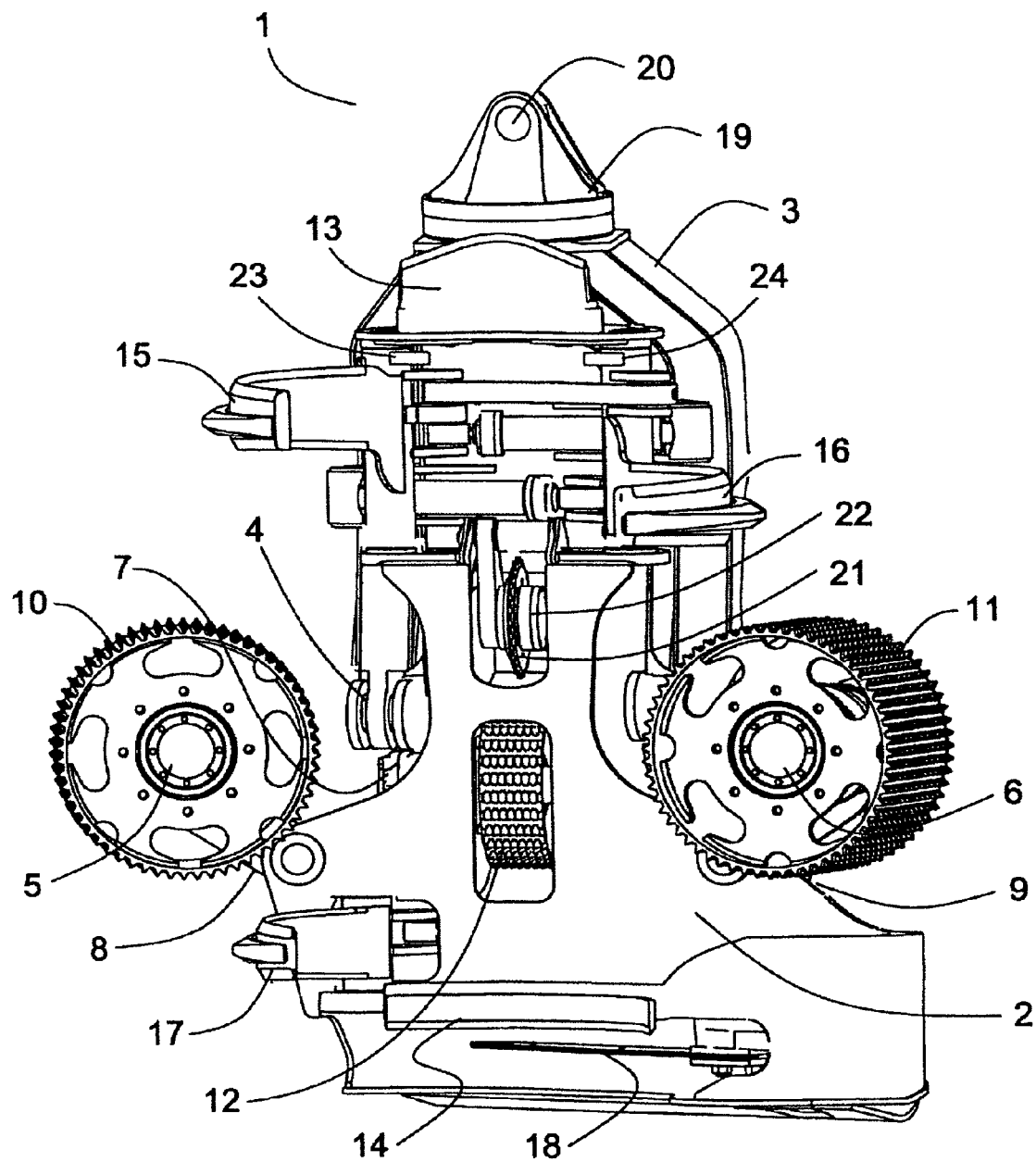
FIG. 1 is an isometric view of a typical tree-harvesting head in the vertical or felling position.
Figure 2:
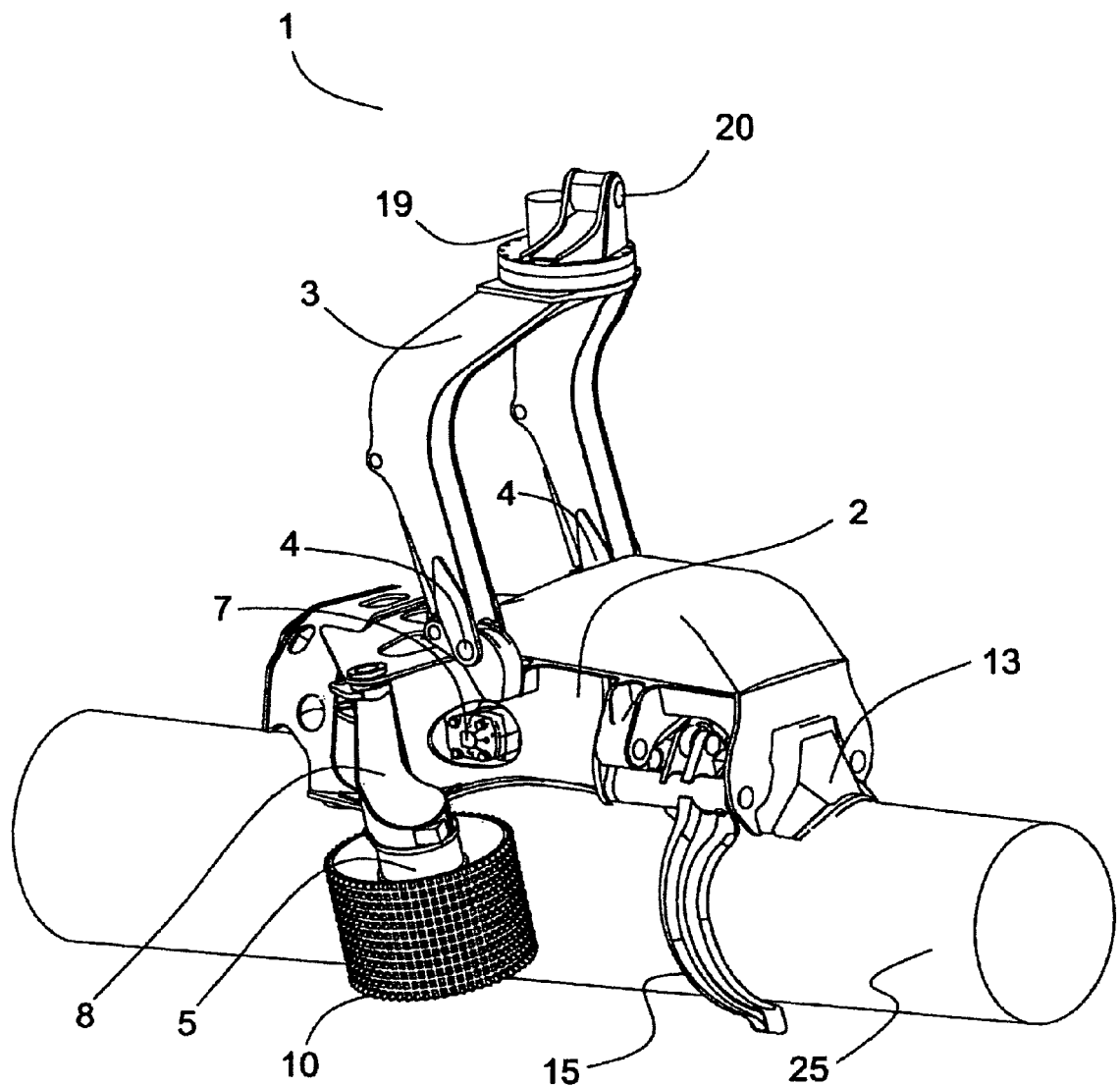
FIG. 2 is an isometric view of the same head in the horizontal or delimbing and bucking position.

Referring to FIG. 1, a tree-harvesting head, typical of the preferred embodiment, is shown in the vertical or tree-harvesting position. In this position, the head cuts or fells the tree or group of trees (not shown) using a severance means such as a saw or shear as is known in the prior art. If the trees being felled are small and the head is equipped with accumulating-type arms, for example as shown in United States Patent Application publication no. US2003/0116225 (Kettunen), the head can successively cut and gather a bunch of trees. Once the tree or bunch of trees is collected, the head is tilted substantially forward into a substantially horizontal position, as shown in FIG. 2, to effect the processing operations as is known in the prior art.

Referring again to FIG. 1, harvesting head 1 is configured with a main support frame 2 that is pivotally connected to cradle 3 at pivot connection 4. This connection allows the main support frame to pivot forward relative to said cradle from a substantially vertical harvesting position as in FIG. 1 to a substantially horizontal processing position as in FIG. 2. One or more hydraulic cylinders (not shown) are pivotally connected between said cradle and said main frame to effect said pivoting. Cradle 3 is equipped with a hydraulically-driven rotator 19, allowing the head to be rotated about a substantially vertical axis to align the harvesting head to the tree when in the harvesting position and to orient the head as is needed when in the processing position. Rotator 19 is pivotally connected to the distal end of a boom member (not shown) of a forestry carrier (not shown) at pin 20. The forestry carrier can be any of a type such as a tracked or wheeled harvester as is known in the art. The forestry carrier supplies pressurized hydraulic oil to the head via hydraulic conduits (not shown). Hydraulic control valves (not shown) actuate the various harvesting head functions dependent upon outputs from the valve control system. The valve control system receives inputs from the operator of the harvester carrier as well as inputs from various sensors on the harvesting head and carrier and, in combination with the programming of the system, effects the outputs that control the various harvesting head functions. The valves and control system may be mounted on the harvesting head or may be mounted on the carrier or partly on the head and partly on the carrier.

The harvesting head main support frame 2 supports fixed knives 13 and 14 which sever limbs as the tree feeds through the head. Knife arms 15, 16 and 17 are pivotally connected to frame 2 and actuated via hydraulic cylinders (not shown). The knife arms are used to grab a tree or group of trees when harvesting and their sharpened edges remove tree limbs as the tree feeds through the head during processing. The hydraulic pressures to the actuating cylinders are modulated via the control valves and control system to optimize the clamping of the tree or group of trees while minimizing friction as the tree feeds through the head.

Feed wheel arms 8 and 9 are pivotally connected to frame 2 and actuated via hydraulic cylinders (not shown). Hydraulic motors 5 and 6 are mounted to wheel arms 8 and 9 respectively. A third hydraulic motor 7 is mounted in the frame 2. Tree feeding drive wheels 10, 11, and 12 are mounted to and driven by the respective motors 5, 6, and 7. These drive wheels are equipped with various friction-improving surface textures and materials to better grip and feed the tree and for debarking as is required in the various harvesting applications. Saw 18 cuts the tree, either for felling in the harvesting position or for bucking to a desired length in the processing position. Length measuring wheel 21 contacts and is driven by the tree as the tree is fed through the head. Sensor 22 is actuated by wheel 21 to measure the length of a tree. Sensors 23 and 24, actuated via knife arms 15 and 16, measure the diameter of the tree being processed. Signals from sensors 22, 23 and 24 are input to the valve control system (not shown).

In the preferred embodiment, tree feeding commences with all three tree-feeding drive wheels simultaneously driving the tree longitudinally through the head. During feeding, once the approximate maximum feeding speed of the three drive wheels is achieved, the center feed drive wheel motor 7 is shifted to a free-wheeling condition. This allows maximum feed speed to then increase as detailed below.

FIG. 2 shows the device during processing of tree 25. It feeds the tree longitudinally through the head using the drive wheels 10, 11 and 12. The drive wheels require high torque from feed drive motors 5, 6 and 7 respectively to overcome friction and the inertia of the tree and to effect the delimbing process. If the tree and limbs are small or once the tree has been accelerated up to speed, less drive torque is required and more speed is desired. With fixed displacement motors, the maximum drive torque and feed speed is defined by the parameters of combined total feed motor displacement, corresponding feed wheel diameter, and available hydraulic flow and pressure from the forestry carrier (horsepower). To enable an increased feed speed while maintaining the same fixed displacement motors, same feed wheel diameters and same hydraulic flow and pressure from the carrier, the sum of the motor displacements must be reduced. To achieve this, two or more independently controlled hydraulic feed wheel motors are required. For maximum torque when starting to feed the tree or when large limbs are encountered during feeding, all of the feed motors are required, using all of the available motor displacement, which limits maximum available speed. To increase speed beyond this limit, one or more of the motors can be shifted from driving to free-wheeling, then acting as a simple idler wheel. This then allows the total available oil flow to act on a reduced total motor displacement, resulting in a higher possible feed speed at a reduced feed force.

Improvements sought by this invention include increased feed force and feed speed compared to that achievable with fixed displacement motors alone, reduced component wear for the motor(s) used only when high feed force is required, reduced component cost compared to gear reduction units or variable displacement motors and the like, larger total contact area between the feed drive wheels and the tree(s), increased traction during high torque operation, reduced friction during feeding and improved individual feed motor control for enhanced debarking capabilities. Some or all of these improvements are realized by the invention.

Figure 3:
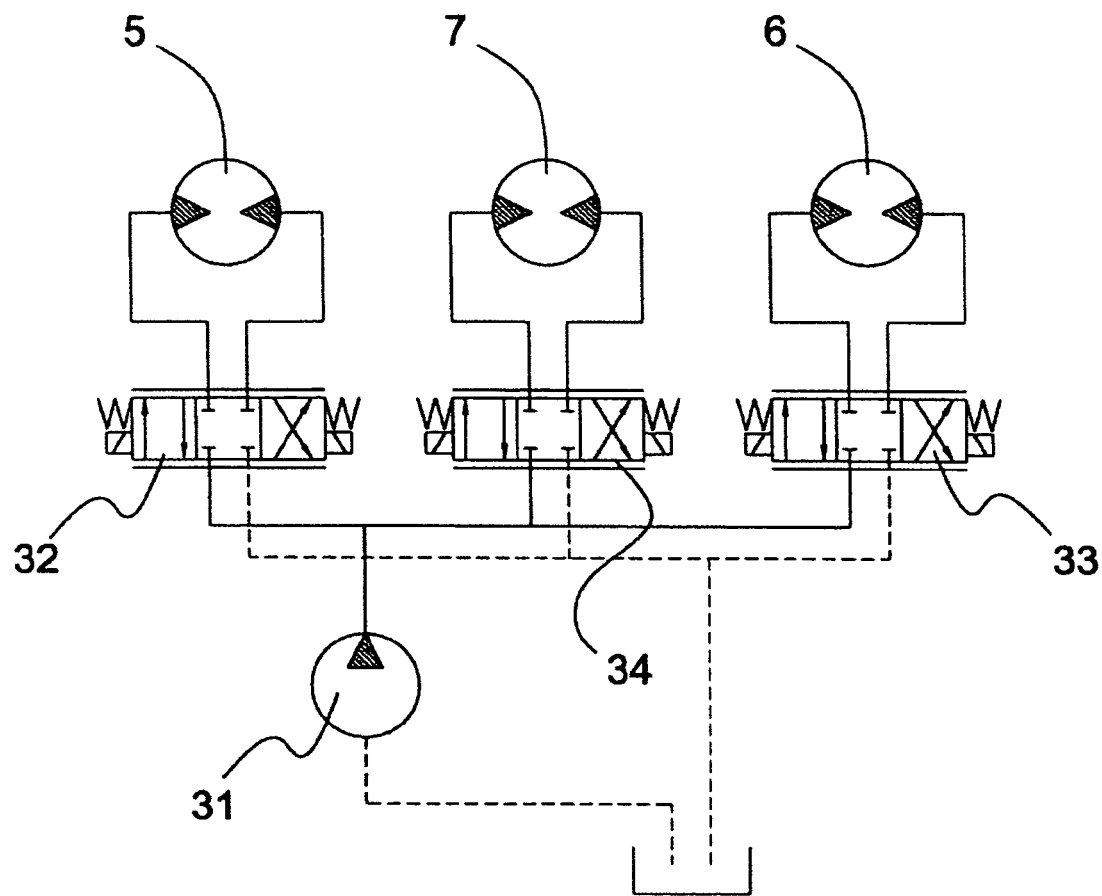
FIG. 3 is a hydraulic schematic of a prior art device with three directional control valves each controlling one tree feeding drive motor.

FIG. 3 shows a simplified prior art hydraulic schematic with directional control valves (DCV's) 32, 33, and 34 individually controlling oil flow to drive motors 5, 6, and 7 respectively, from the hydraulic pump 31.

Figure 4:
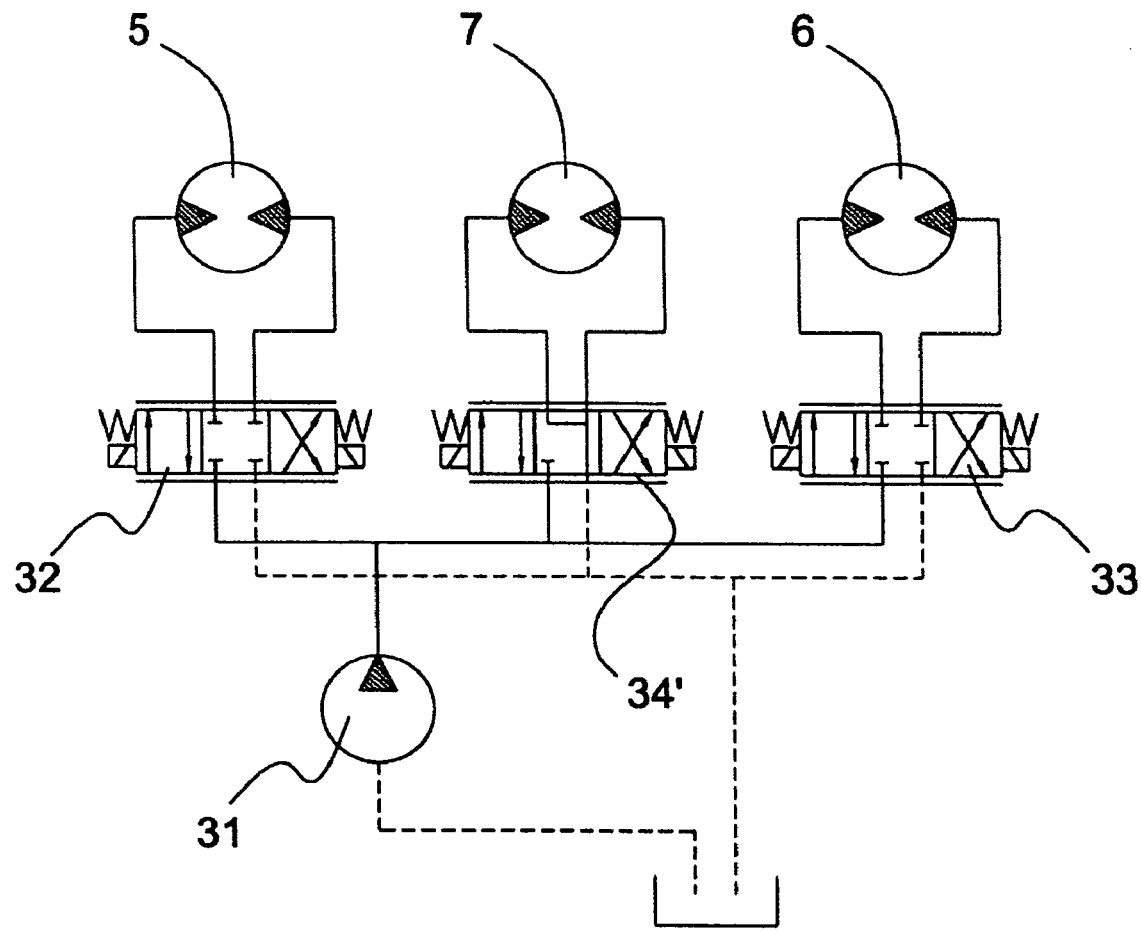
FIG. 4 is a hydraulic schematic showing the present invention as applied to the device of FIG. 3.

FIG. 4 is a simplified hydraulic schematic showing the hydraulic pump 31 supplying oil flow to DCV's 32, 33, and 34', connected in parallel. These DCV's can be activated hydraulically or electrically, each controlling oil flow to a single fixed displacement hydraulic motor. This example shows a three motor circuit, but can be configured from as few as two motors, and not limited by any maximum number of motors.

DCV's 32 and 33 have closed center-spool positions, providing the necessary restriction of oil flow to prevent the motors 5 and 6 from spinning when acted upon by external forces, resulting in a braking effect to hold these motors in a static state, or bring them to a static state from a dynamic state. DCV 34' has an open center-spool position, allowing the motor 7 to spin freely when acted upon by external forces. All motor displacements are matched to the geometrical design of the harvesting head, and the diameters of the wheel mounted to the motor, to achieve equal line speeds, and similar output feed force when the motors are actively driven.

Assuming the motors 5, 6, and 7 are starting from a static state, to accelerate a tree in the harvesting head, DCV's 32, 33, and 34' must be engaged fully to allow maximum oil flow to these motors. With sufficient hydraulic flow and pressure from the carrier, motors 5, 6, and 7 will achieve maximum speed, limited only by the available oil flow. To increase tree speed beyond this limit, the sum of the displacements of motors 5, 6, and 7 must be reduced. Reducing the total motor displacement is achieved by removing motor 7 from the parallel circuit, by deactivating DCV 34', returning it to the open center-spool position. This allows motor 7 to "freewheel", and the oil flow no longer required by this motor is distributed to motors 5 and 6. With motor 7 in the freewheel state, it provides reduced friction for the tree to travel through the harvesting head, allowing drive motors 5 and 6 to achieve a higher speed at reduced hydraulic pressures.

Figure 5:
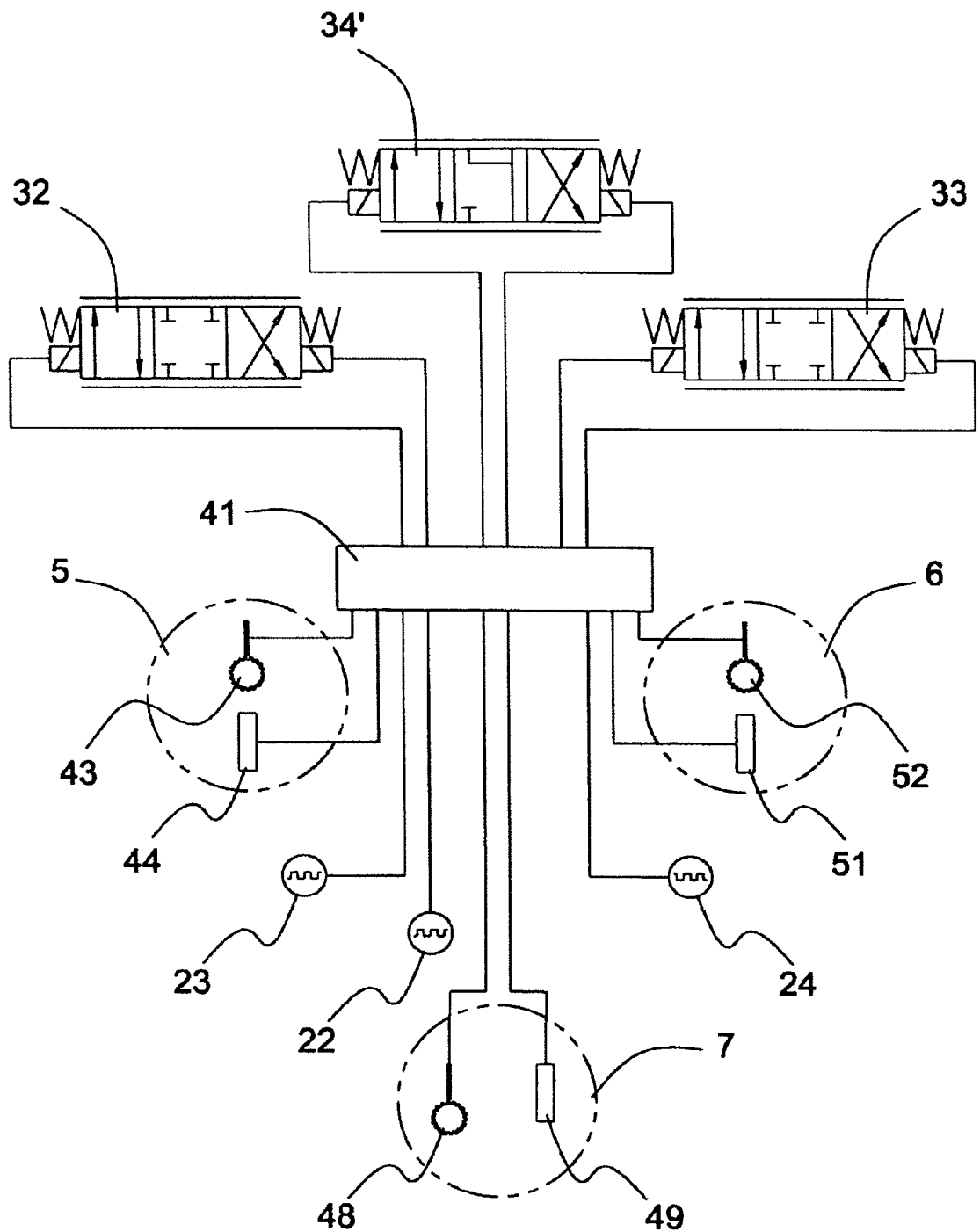
FIG. 5 is a control schematic for the control system for the present invention.

FIG. 5 is a simplified electrical schematic used to show how the hydraulic circuit in FIG. 4 can be controlled. Control system 41 receives inputs from sensors 22, 23, 24, 43, 52, 48, 44, 51 and 49 mounted on the harvesting head, used to determine tree length, tree speed, tree diameter, drive motor speeds, and drive motor pressures.

A length sensor 22 measures the distance of a tree through the harvesting head. This input to the control system 41 related to time is used to calculate the speed of the tree. Speed sensors 43, 48, and 52 input to the control system 41. Pressure sensors 44, 51, and 49 are mounted to each drive motor 5, 6 and 7, and input to control system 41.

The signals from sensors 22, 43, 44, 48, 49, 51, and 52 are used by the control system 41 to continually monitor the tree speed, drive motor speeds, and drive motor hydraulic pressures. These inputs to the control system can lead to continuously variable output signals to DCV's 32, 33, and 34', enabling maximum efficiency from the hydraulic circuit, and to reduce or eliminate drive wheel slip on the tree. Also, upon achieving a set speed and/or reduced drive motor pressures, the DCV 34' controlling drive motor 7 can be shifted by the control system 41 to the float or "free-wheeling" position, redirecting all of the oil flow to the remaining drive motors 5 and 6. This results in a large displacement parallel hydraulic drive motor circuit for generating maximum feed force to begin accelerating the tree from a static state, and then shifting to a reduced displacement parallel hydraulic drive motor circuit to generate higher tree speeds than available with all the drive motors in parallel.

In addition to input from the sensors and the programming of control system 41, it is preferable that the operator of the forestry carrier be able to provide input to the control system to allow for full or partial manual control of the shifting of drive motor 7. For instance, in certain tree species or diameters of trees, it may be preferable for the operator to have full control of when or if drive motor 7 shifts to a free-wheeling condition.

Figure 6:
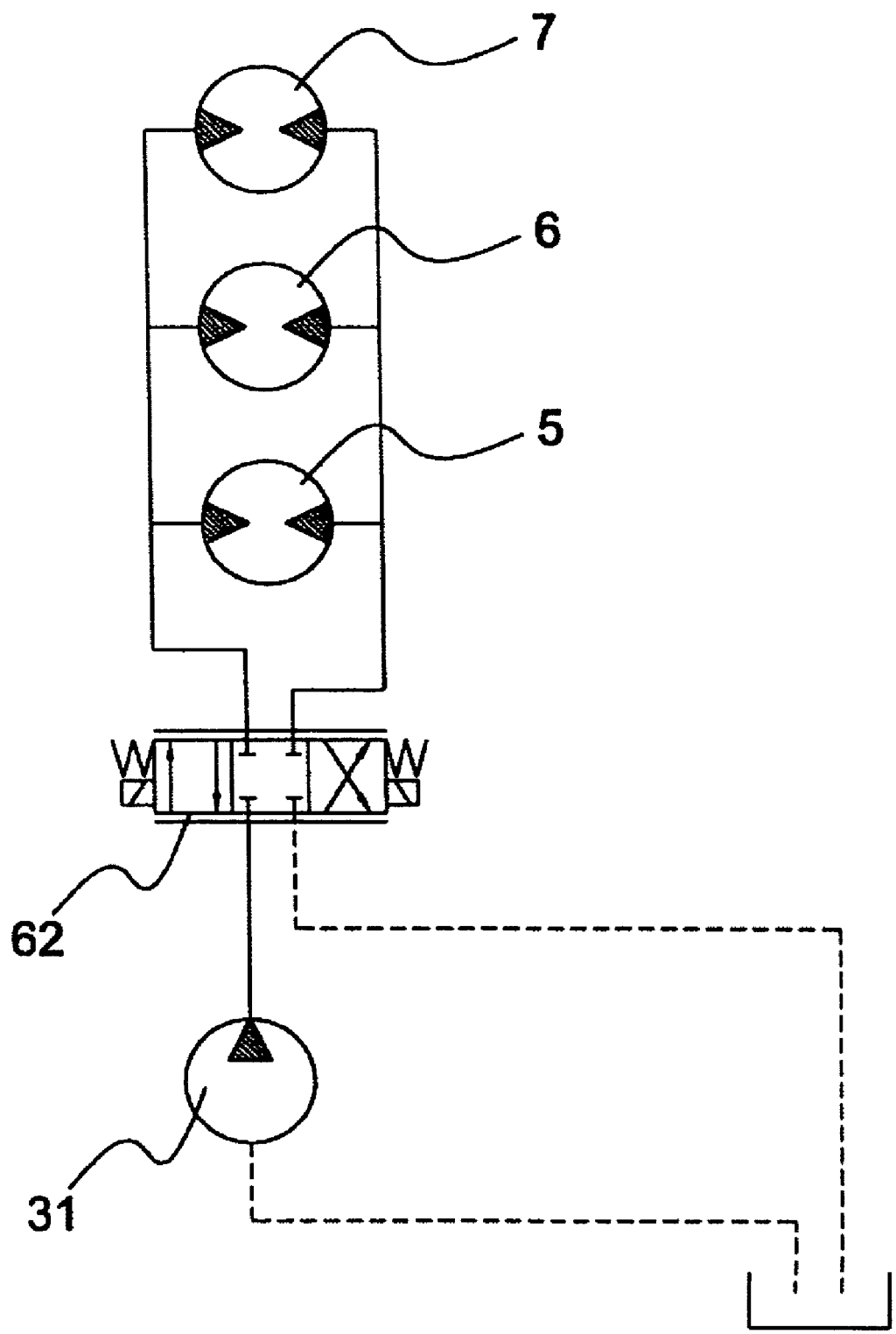
FIG. 6 is a hydraulic schematic of a prior art device using one directional control valve for three tree feeding drive motors connected in parallel.

FIG. 6 shows a simplified prior art hydraulic schematic with DCV 62 controlling oil flow to drive motors 5, 6, and 7.

Figure 7:
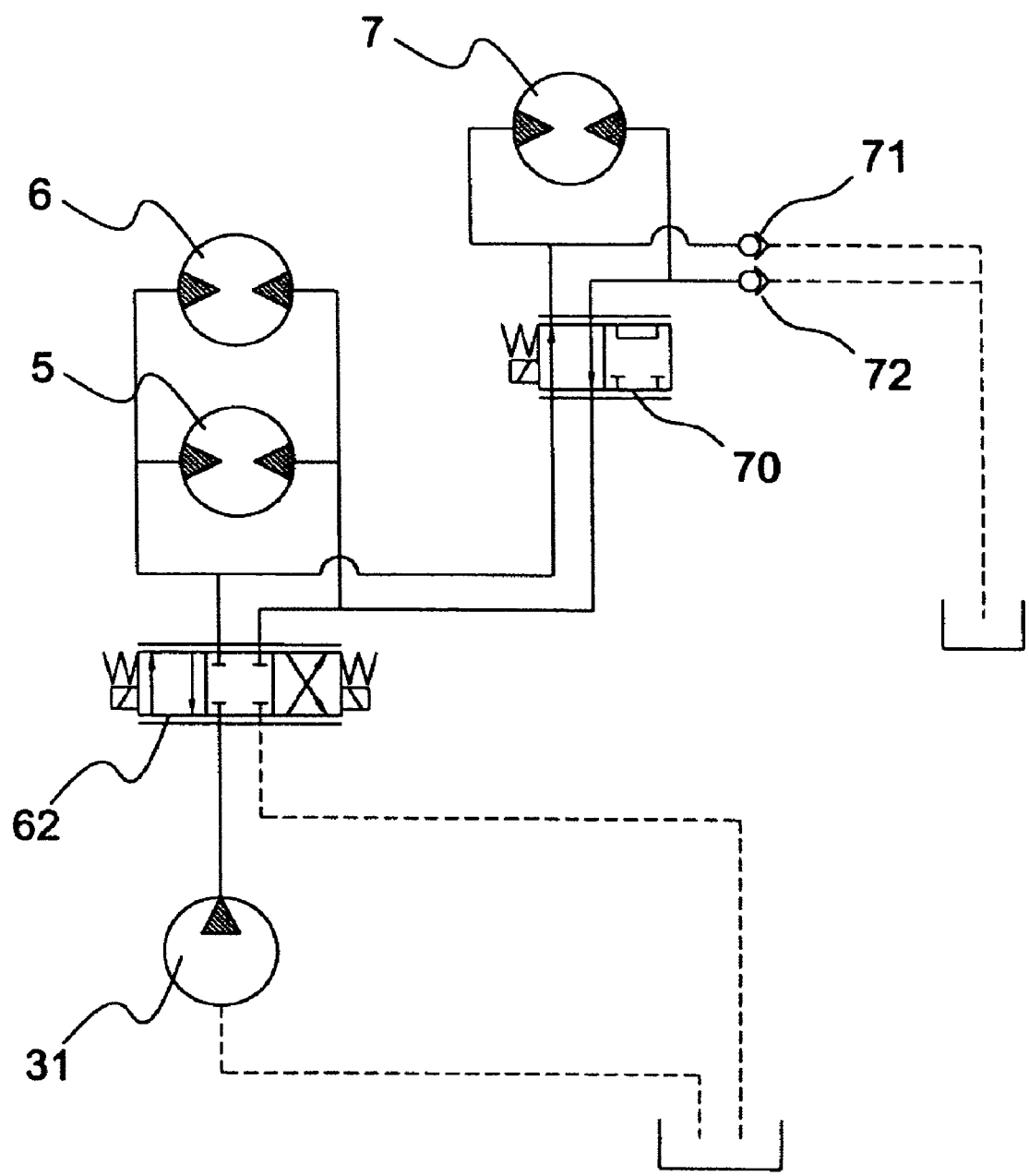
FIG. 7 is a hydraulic schematic of an alternative embodiment of the invention as applied to the prior art device in FIG. 6 and shown with all three motors driving.

FIG. 7 is based on the simplified hydraulic schematic of FIG. 6, and adds a DCV 70 to allow motor 7 to shift into a float position. This results in a large displacement parallel hydraulic drive motor circuit for generating maximum feed force to begin accelerating the tree from a static state.

Figure 8:
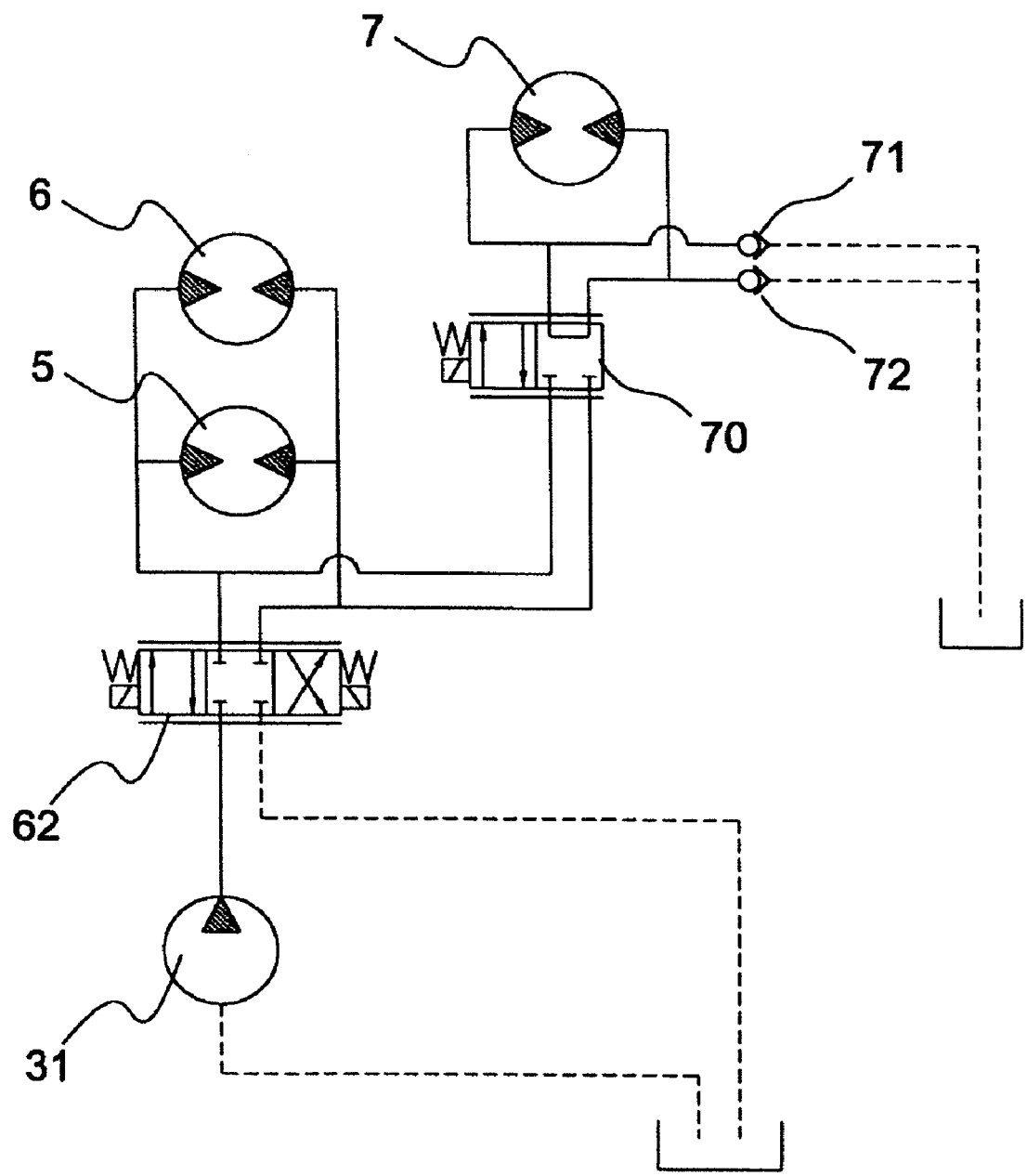
FIG. 8 is the hydraulic schematic of FIG. 7 shown with two motors driving and one motor shifted to "free-wheeling" mode.

FIG. 8 shows FIG. 7 with DCV 70 shifted into the float position. This results in a reduced displacement parallel hydraulic drive motor circuit to generate higher tree speeds than available with all the drive motors in parallel. Anti-cavitation check valves 71 and 72 are required to prevent hydraulic cavitation of drive motor 7 when DCV 70 is shifted into the float position, and to ensure minimum pressure differential through motor 7, resulting in minimum rolling resistance for the tree through the harvesting head.

Figure 9:
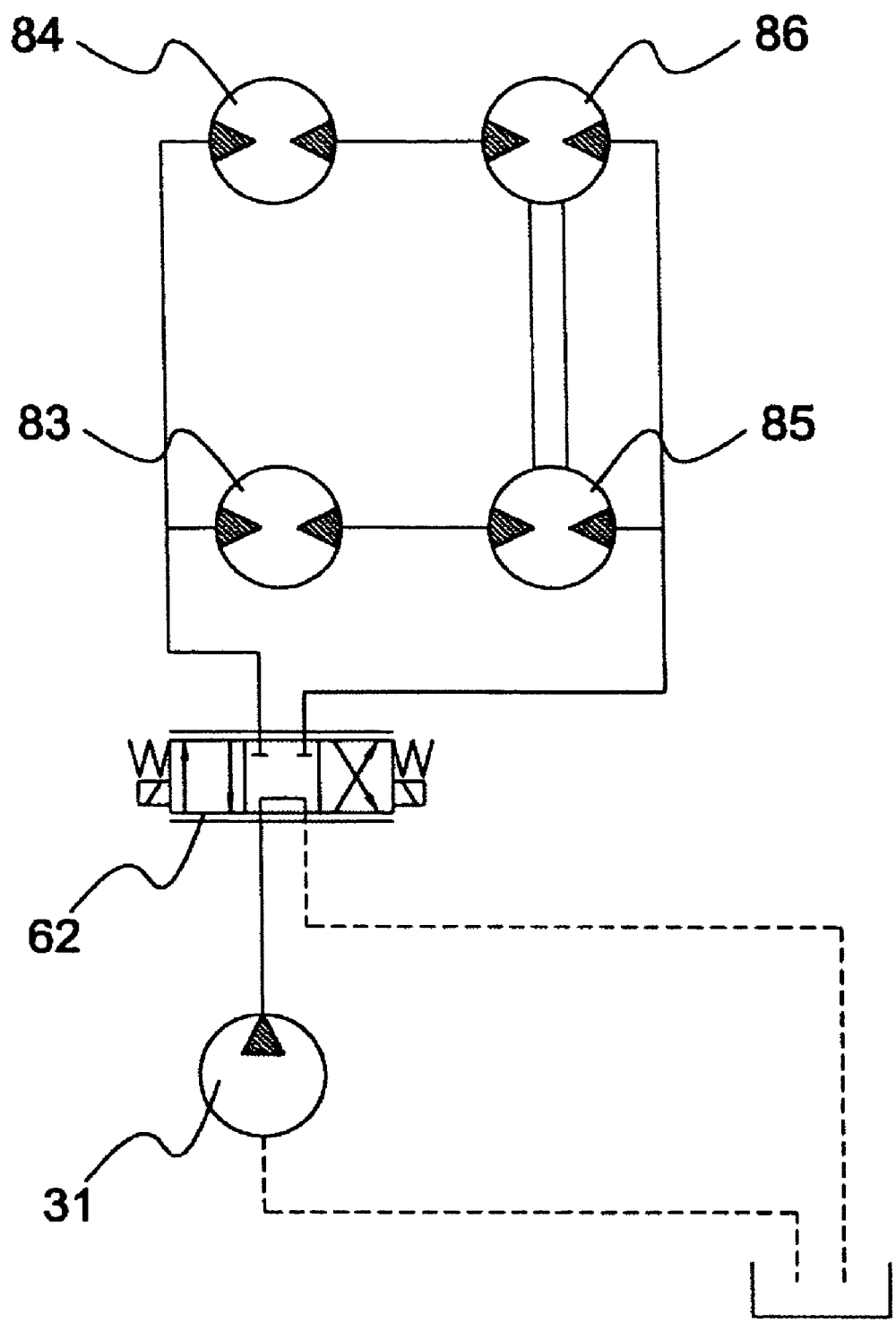
FIG. 9 is a hydraulic schematic of the Pinomaeki design.

FIG. 9 shows a simplified prior art hydraulic schematic, of the type shown in the above-referenced international patent application publication number WO 99/41972.

Figure 10:
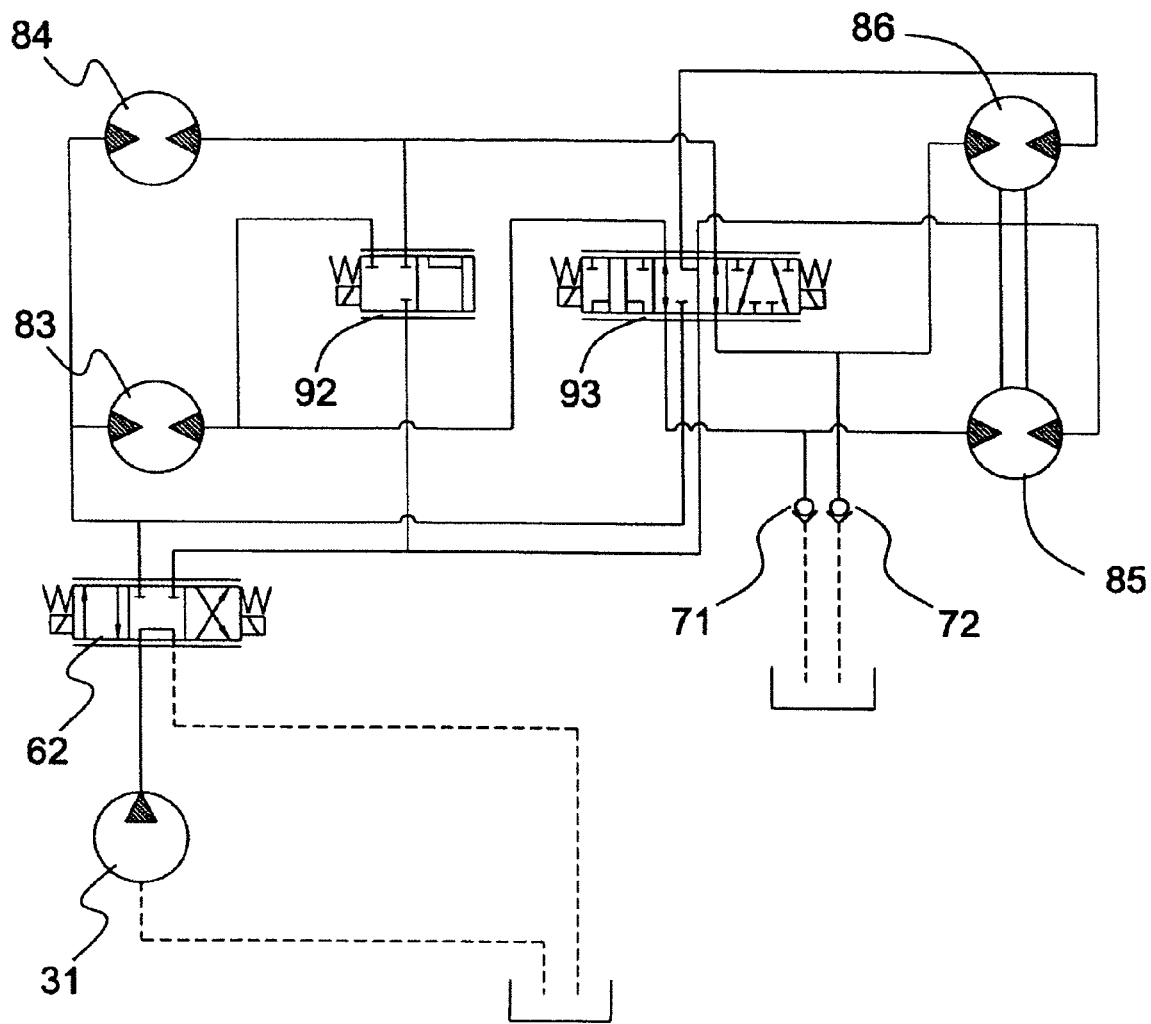
FIG. 10 is a hydraulic schematic of the current invention as applied to the Pinomaeki design with the valves shifted to provide the same drive control as in FIG. 9.

FIG. 10 is based on the simplified hydraulic schematic of FIG. 9, and adds DCV's 92 and 93. Drive motors 84 and 86 are normally connected in series, and drive motors 83 and 85 are normally connected in series, and these two series circuits are connected in parallel relative to each other.

Figure 11:
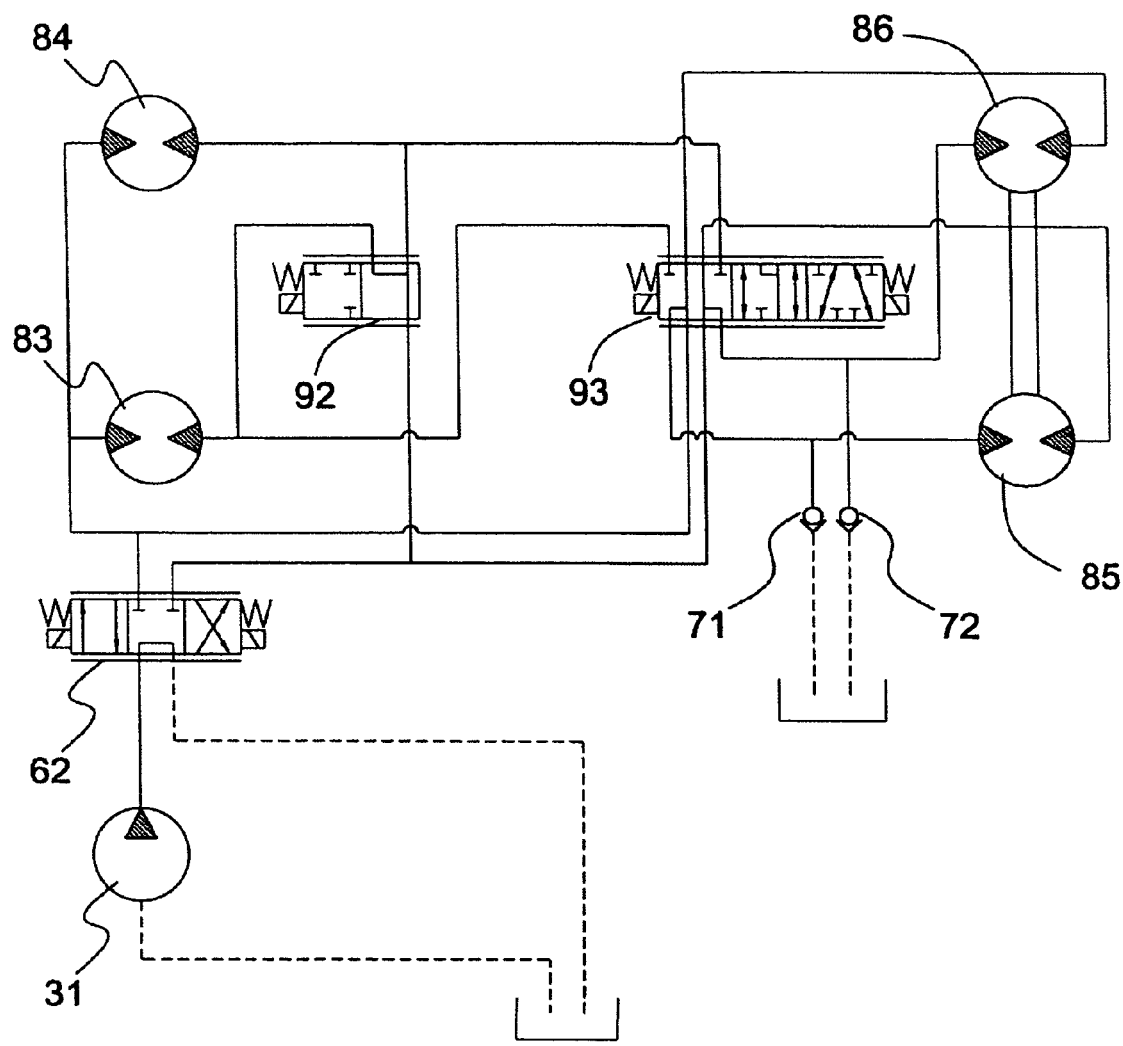
FIG. 11 is the hydraulic schematic of FIG. 10 with the valves shifted to provide full parallel oil flow for maximum feeding force.

FIG. 11 shows FIG. 10 with DCV 92 shifted fully, and DCV 93 shifted to the right, creating a four drive motor parallel circuit with drive motors 83, 84, 85, and 86. This results in the largest possible displacement parallel hydraulic drive motor circuit for generating maximum feed force to begin accelerating the tree from a static state.

Figure 12:
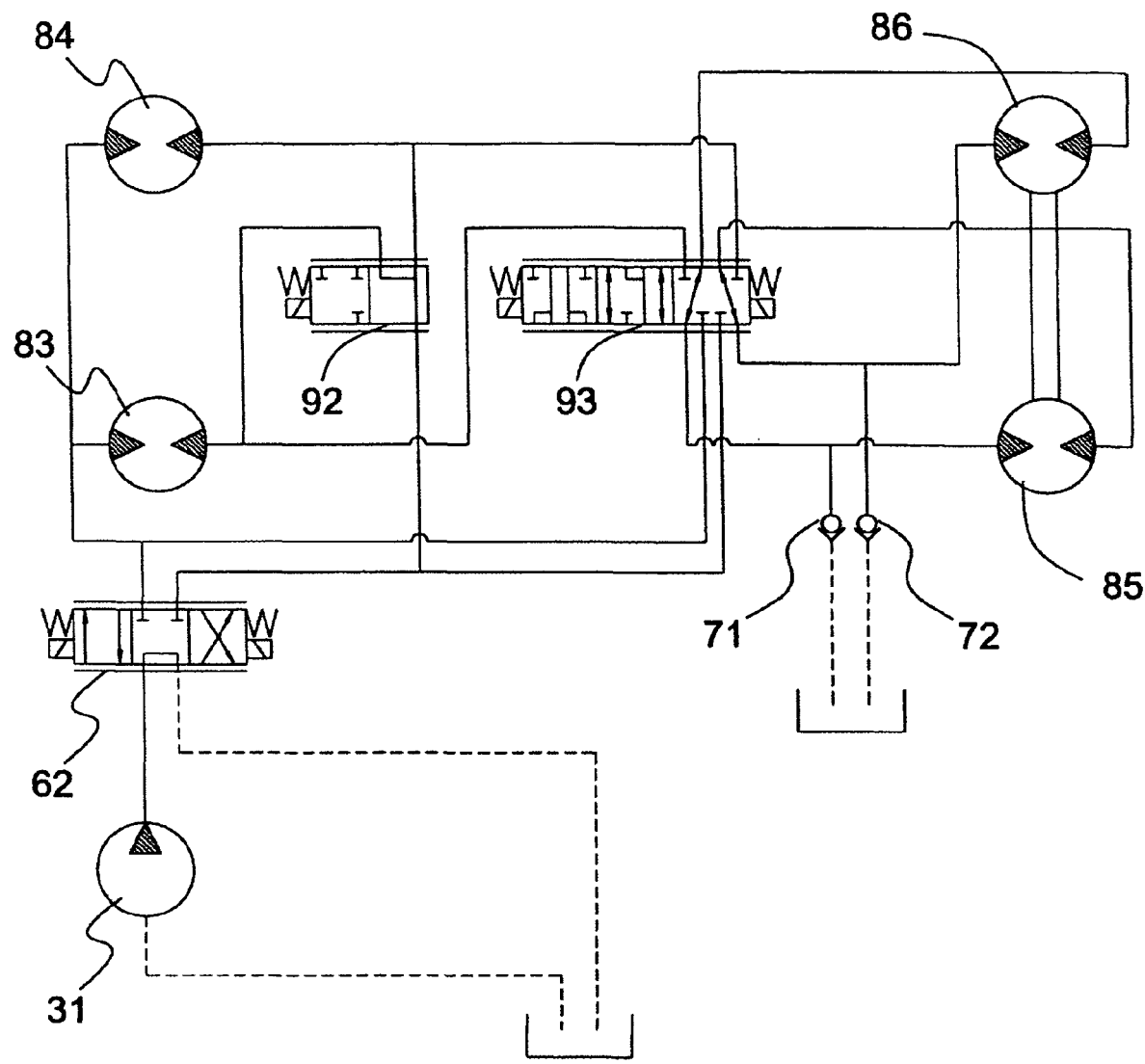
FIG. 12 is the hydraulic schematic of FIG. 10 with the valves shifted to provide free-wheeling capability for maximum feeding speed.

FIG. 12 shows FIG. 10 with DCV 92 shifted fully, and DCV 93 shifted to the left, creating a two drive motor parallel circuit with drive motors 83 and 84, and a float circuit for drive motors 85 and 86. This results in a reduced displacement parallel hydraulic drive motor circuit to generate higher tree speeds than available with all drive motors in parallel. Anti-cavitation check valves 71 and 72 are required to prevent hydraulic cavitation of drive motors 85 and 86 when DCV 93 is shifted into the float position, and to ensure minimum pressure differential through motors 85 and 86, resulting in minimum rolling resistance for the tree through the harvesting head.

Figure 13:
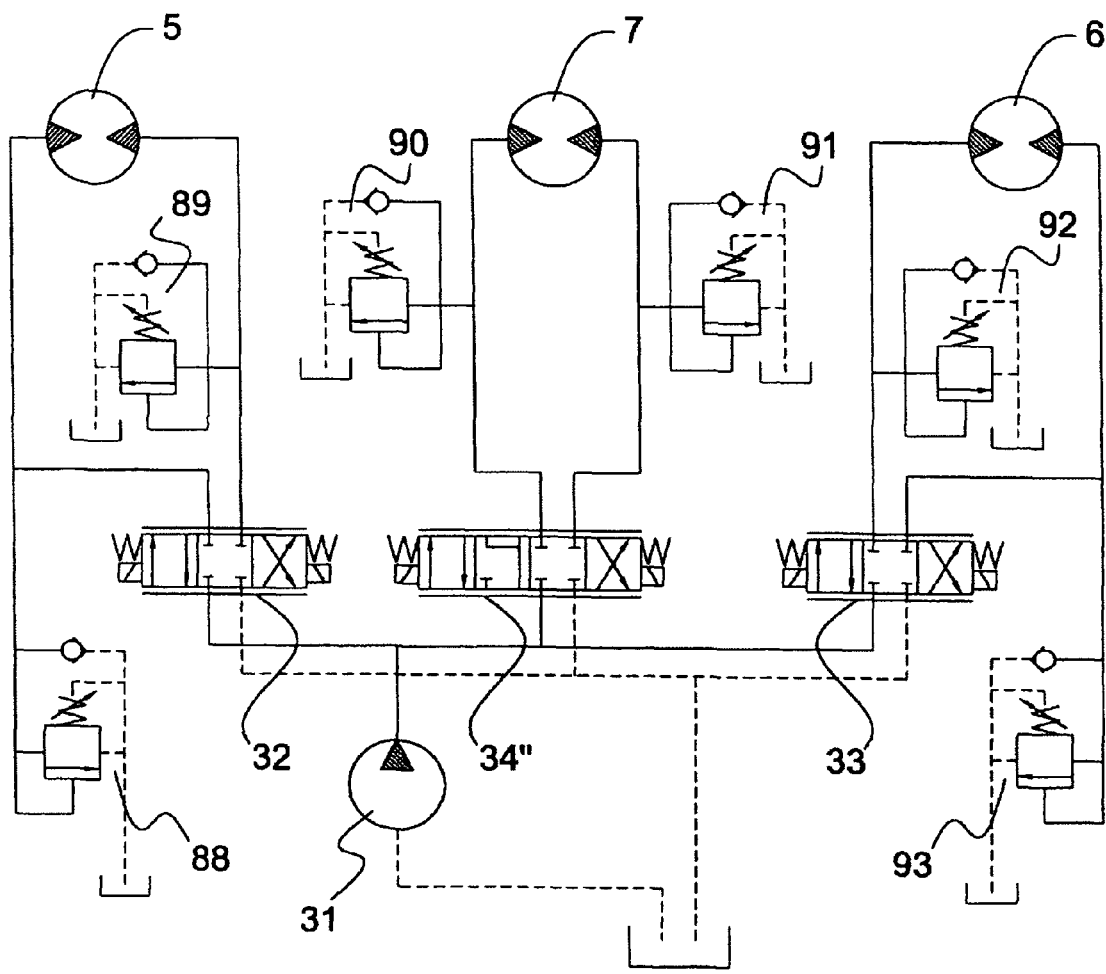
FIG. 13 is the hydraulic schematic of FIG. 4 with a 4-position flow control spool for the free-wheeling drive to provide an additional braking effect.

FIG. 13 shows FIG. 4 with DCV 34" shown with a 4-position flow control spool shifted to the left on the closed center-spool position, providing the necessary restriction of oil flow to prevent the motor 7 from spinning when acted upon by external forces, resulting in a braking effect to hold this motor in a static state, or bring it to a static state from a dynamic state. As is typical in hydraulic circuits, relief valves with anti-cavitation check valves 88, 89, 90, 91, 92, and 93 are matched to their respective DCV's 32, 34", and 33, to prevent circuit over-pressurization, cavitation, and to control dynamic braking when the spools are in the closed center-spool position. Through the use of computer programming and solenoid control for DCV 34", the free-wheeling and braking conditions can be activated when desireable to achieve both improved tree feeding and improved braking performance.

A particular advantage of this configuration is in multiple-tree harvesting. As is known in the art, in this method of harvesting the head is configured with one or more accumulating-type arms, sometimes also functioning as a knife arm.

Successive trees are taken, cut and accumulated in a bunch prior to processing. As the bunch is being collected, often the trees will slide in the head resulting in damage to the tree and damage to the saw. By shifting DCV 34" to the braking position, the motor and drive wheel are effectively locked in position. When the tree or bunch of trees are clamped against this wheel, the wheel will grip the tree or bunch of trees and minimize any movement. This improves the speed and efficiency of harvesting multiple trees and minimizes damage caused by tree movement.

Another advantage of this configuration is in tree debarking applications. As was described previously, it often requires several full length tree feeding passes to completely remove the bark from the tree. By using the configuration of FIG. 13, it is possible to operatively cycle one or more of the tree feeding drive motors from driving, to providing a differential linear feed speed to one or more of the other tree feeding means, to free wheeling or even to braking to more effectively remove the bark from the tree. Through optimized programming of the timing and sequence of this cycling, it is possible to more effectively remove the bark from the tree in each pass, thereby reducing the total number of tree feeding passes required. This would greatly improve the overall productivity and efficiency of the operation. Obviously, the configuration of FIG. 4 and its variations could be applied to debarking in a similar manner. It is not necessary for the tree feeding drive having free-wheeling capability to be the one programmed to create the differential tree-feeding speed and intermittent braking, but it is preferred.

Figure 14:
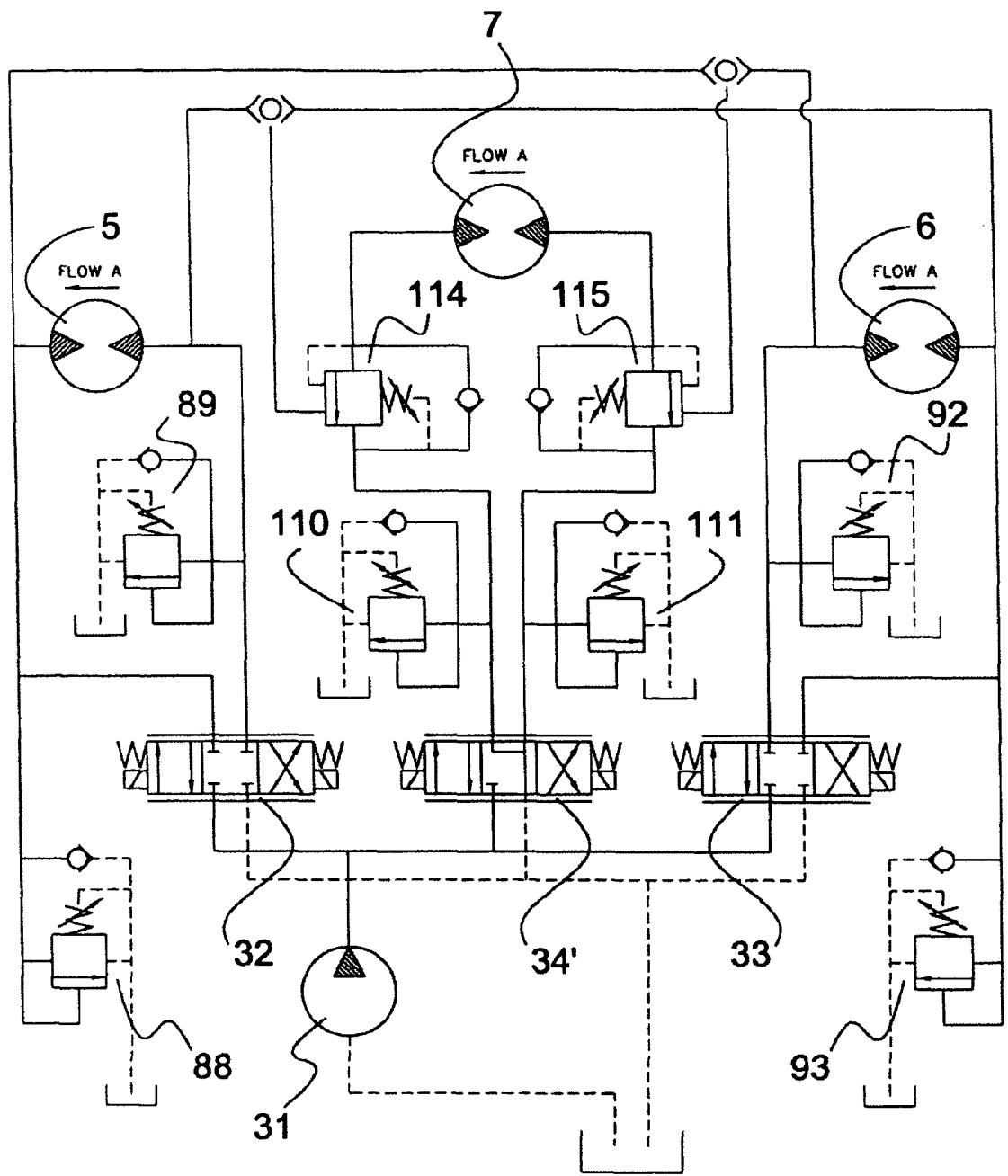
FIG. 14 is a hydraulic schematic showing another method of achieving the same effect as in FIG. 13, with the added feature of independent pressure settings for the circuit protection relief valves.

FIG. 14 shows another method of achieving the same effect as in FIG. 13, with the added feature of having independent pressure settings for the circuit protection relief valves 110 and 111, and the dynamic brake relief valves 114 and 115. This enables greater control of the dynamic braking circuit to better match the components used in the circuit and the operating conditions of the harvesting head.

Figure 15:
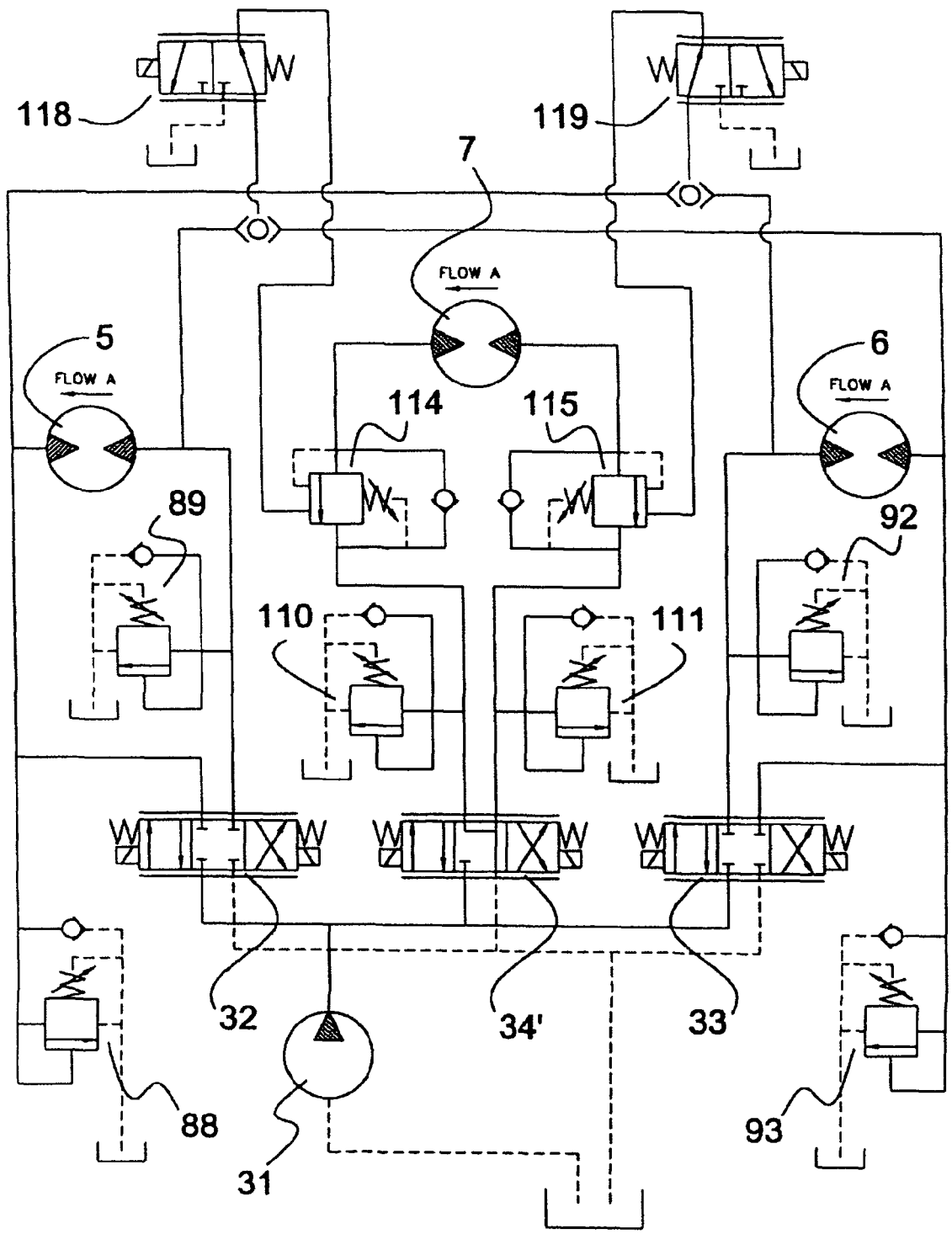
FIG. 15 is a hydraulic schematic showing another method of achieving the same effect as in FIG. 14, with the added feature of having independent control of when the drive motor is in free-wheel or in dynamic brake state.

FIG. 15 shows another method of achieving the same effect as in FIG. 14, with the added feature of having independent control of when the drive motor 7 is in a free-wheel or dynamic brake state. Through the use of computer programming and solenoid control on valves 118 and 119, free-wheel and brake conditions for motor 7 can be independently controlled in either rotation direction. This independent control on motor 7 can be used to reduce the drive speed relative to motors 5 and 6, which can be beneficial during debarking operations. The differential wheel speeds can result in increased efficiency for removing bark from the tree.

Other benefits of this invention can be reduced fuel consumption by controlling the engine to match the power demand of the harvesting head, increased component life due to maximizing the efficiency of the drive motor circuit, increased drive motor life due to the free-wheeling capability, reduced heat generated by the drive motor circuit due to the maximized efficiency, higher attainable tree speeds at lower drive motor circuit pressures due to reduced friction through the harvesting head at higher speeds, improved tree processing and production, and reduced operator fatigue.

The invention, as described in the preferred embodiment above, is not limited to a device of that design. Specific features of the preferred embodiment referred to above are not necessarily essential features of the invention as broadly defined. Those skilled in the art will be able to apply the invention to any variety of tree processing and harvesting heads and tree handling machines wherein the improvements to tree feeding as described would be advantageous, using the general principles of the invention and/or its preferred embodiment. For instance, without limiting the generality of the foregoing, three knife arms and three tree-feeding wheels are shown in the preferred embodiment. Any combination or type of tree feeding means, tree cutting means and tree delimbing or debarking means could be used. Also any combination, position and method of actuation of sensors could be employed.

The invention claimed is:

1. A tree handling device comprising:
   a support frame for mounting to a logging vehicle;
   a plurality of tree feeding means for feeding trees through the tree handling device, mounted on the support frame;
   a plurality of control valves controlling said tree feeding means; and
   a control system for engaging and disengaging said control valves during tree feeding;
   wherein the control system and the plurality of control valves are configured such that at least one of and less than all of the plurality of tree feeding means is shifted from a driving to a free-wheeling condition, while maintaining relative contact between a tree and the at least one of and less than all of the plurality of tree feeding means, in order to increase a feed speed of the tree handling device.

2. A tree handling device as in claim 1 wherein:
   the at least one of said tree feeding means can be operatively shifted from a free-wheeling condition to a driving condition during tree feeding in order to increase traction with said tree.

3. A tree handling device as in claim 1 wherein:
   once a tree feeding means is shifted to a free-wheeling condition, said tree feeding means is configured to remain in a free-wheeling condition until such time as tree feeding stops.

4. A tree handling device as in claim 1 further comprising sensors, wherein the sensors on the tree handling device provide feedback to the control system to enable optimal shifting of the at least one of said tree feeding means from a driving to a free-wheeling condition.

5. A tree handling device comprising:
   a support frame for mounting to a logging vehicle;
   a plurality of tree feeding means for feeding trees through the tree handling device;
   a plurality of control valves controlling said tree feeding means; and
   a control system for engaging and disengaging said control valves during tree feeding;
   wherein the control system and the plurality of control valves are configured such that at least one of and less than all of the plurality of tree feeding means is shifted from a driving condition to either of a free-wheeling condition, in order to increase a feed speed of the tree handling device and a braking condition, in order to assist in debarking a tree, while maintaining relative contact between said tree and the at least one of and less than all of the plurality of tree feeding means.

6. A tree handling device as in claim 5 wherein:
   the control system is configured to shift the at least one of said tree feeding means to a braking condition when harvesting a tree or group of trees to minimize movement of said tree or group of trees when clamped against said tree feeding means.

7. A tree handling device as in claim 5 wherein:
   the control system is configured to operatively cycle the at least one of said tree feeding means from a driving condition to a braking condition during tree feeding to more effectively debark the tree.

8. A tree handling device as in claim 5 wherein:
   the control system is configured to operatively cycle the at least one of said tree feeding means from a driving condition to a free-wheeling condition during tree feeding to more effectively debark the tree.

9. A tree handling device as in claim 5 wherein:
the control system is configured to operatively cycle the at least one of said tree feeding means from a free-wheeling condition to a braking condition during tree feeding to more quickly debark the tree.

10. A tree handling device as in claim 5 wherein:
the control system is configured to operatively cycle the at least one of said tree feeding means from a free-wheeling condition to a driving condition during tree feeding to more quickly debark the tree.

11. A tree handling device as in claim 1 wherein:
manual input from the operator of said tree handling device to said control system determines when said tree-feeding means is shifted to a driving or free-wheeling condition.

12. A tree handling device as in claim 5 wherein:
manual input from the operator of said tree handling device to said control system determines when said tree-feeding means is shifted to a driving or free-wheeling condition.

13. A tree handling device comprising:
a support frame;
a plurality of rotary drives mounted on the support frame;
a plurality of control valves configured to drive the rotary drives and configured to allow at least one of and less than all of the plurality of rotary drives to be in a free-wheeling condition; and
a control system for controlling the plurality of control valves, the control system configured to cause the control valves to shift at least one of and less than all of the plurality of rotary drives from a driving to a free-wheeling condition during tree feeding while maintaining relative contact between a tree and the at least one of and less than all of the plurality of rotary drives in order to increase a feed speed of the tree handling device.

14. A tree handling device as in claim 13 wherein:
once the at least one of and less than all of the plurality of rotary drives is shifted to a free-wheeling condition, the tree feeding mechanism is configured to remain in a free-wheeling condition until such time as tree feeding stops.

15. A tree handling device as in claim 13 further comprising:
at least one sensor provided to the tree handling device for sensing at least one variable related to tree feeding and providing feedback to the control system to enable shifting of the at least one of and less than all of the plurality of rotary drives from a driving to a free-wheeling condition.

16. A tree handling device as in claim 13 wherein:
the control system is further configured to cause the control valves to shift the at least one of and less than all of the plurality of rotary drives from a free-wheeling condition to a braking condition in order to increase traction with said tree.

17. A tree handling device as in claim 13 wherein:
the control system is configured to receive manual input from an operator of the tree handling device to shift the at least one of and less than all of the plurality of rotary drives to a free-wheeling condition.

18. A tree handling device as in claim 1 wherein the control system is configured to operatively cycle the at least one of said tree feeding means among a drive condition, a braking condition and a free-wheeling condition during tree feeding to more effectively debark the tree.

* * * * *